(12) United States Patent
Waymire

(10) Patent No.: US 11,618,315 B2
(45) Date of Patent: Apr. 4, 2023

(54) INTEGRAL ANTI-SIPHON FILLER NECK

(71) Applicant: Evan Waymire, Oregon City, OR (US)

(72) Inventor: Evan Waymire, Oregon City, OR (US)

( * ) Notice: Subject to any disclaimer, the term of this patent is extended or adjusted under 35 U.S.C. 154(b) by 207 days.

(21) Appl. No.: 17/120,738

(22) Filed: Dec. 14, 2020

(65) Prior Publication Data

US 2022/0185102 A1    Jun. 16, 2022

(51) Int. Cl.
*B60K 15/03* (2006.01)
*B60K 15/04* (2006.01)

(52) U.S. Cl.
CPC ...... *B60K 15/0403* (2013.01); *B60K 15/0409* (2013.01); *B60K 2015/0346* (2013.01)

(58) Field of Classification Search
CPC ............ B60K 15/0409; B60K 15/0403; B60K 2015/0406
See application file for complete search history.

(56) References Cited

U.S. PATENT DOCUMENTS

2013/0092290 A1*  4/2013  Waymire ........... B60K 15/0403
141/286

* cited by examiner

*Primary Examiner* — Andrew T Kirsch
(74) *Attorney, Agent, or Firm* — Ingrid McTaggart

(57) ABSTRACT

The present invention relates to an integrated anti-siphon fuel filler neck assembly that includes wedge shaped apertures and a side wall that includes side wall apertures connected to the wedge shaped apertures, wherein the wedge shaped apertures and the side wall apertures are sized to prevent a siphon hose from passing there through.

18 Claims, 8 Drawing Sheets

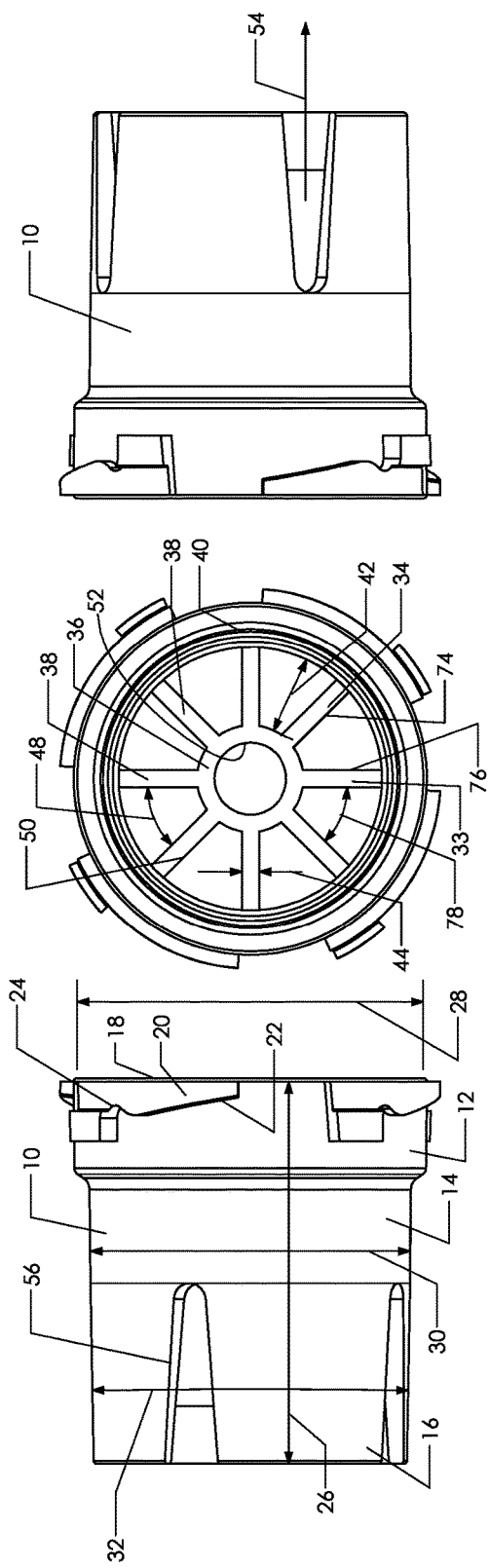
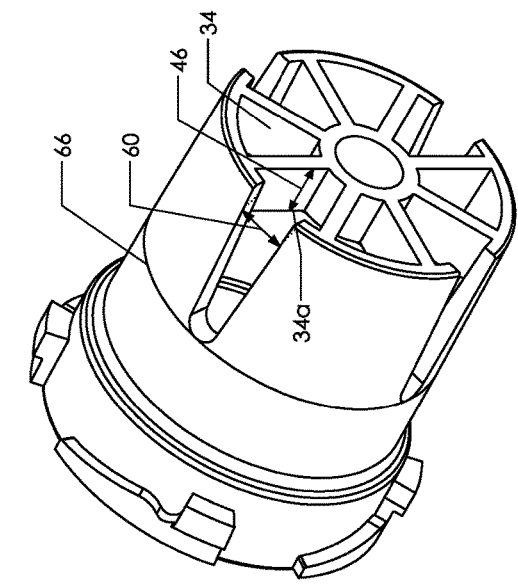
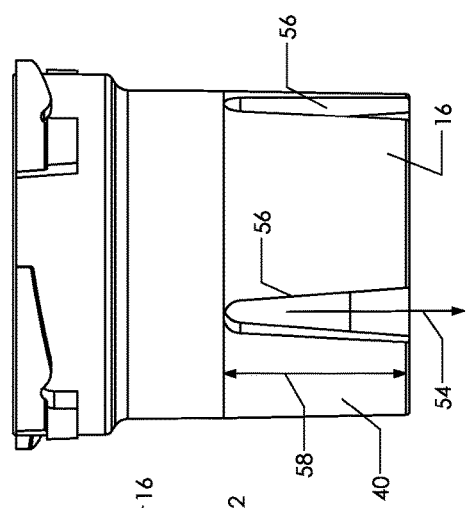
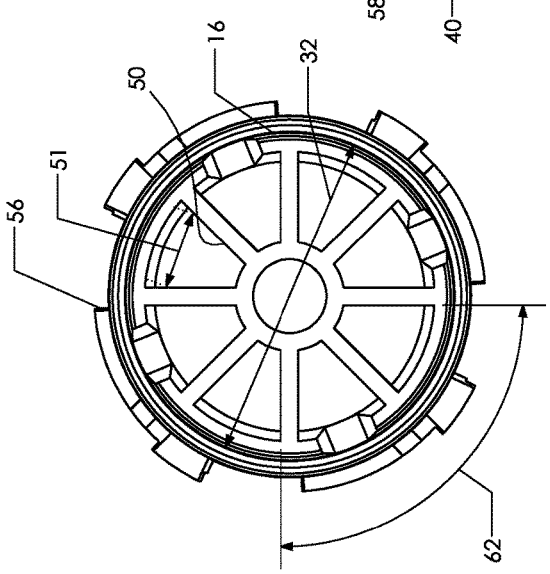

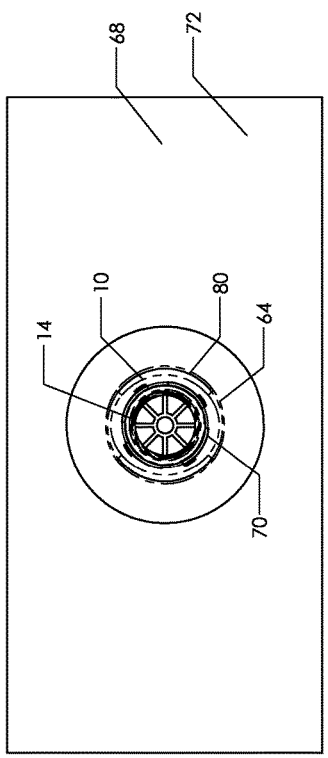
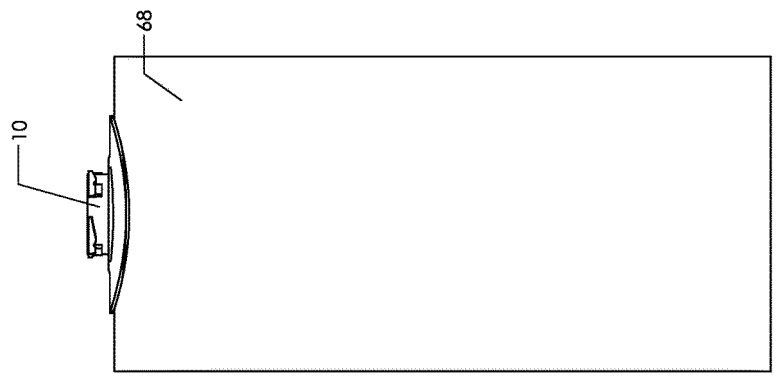
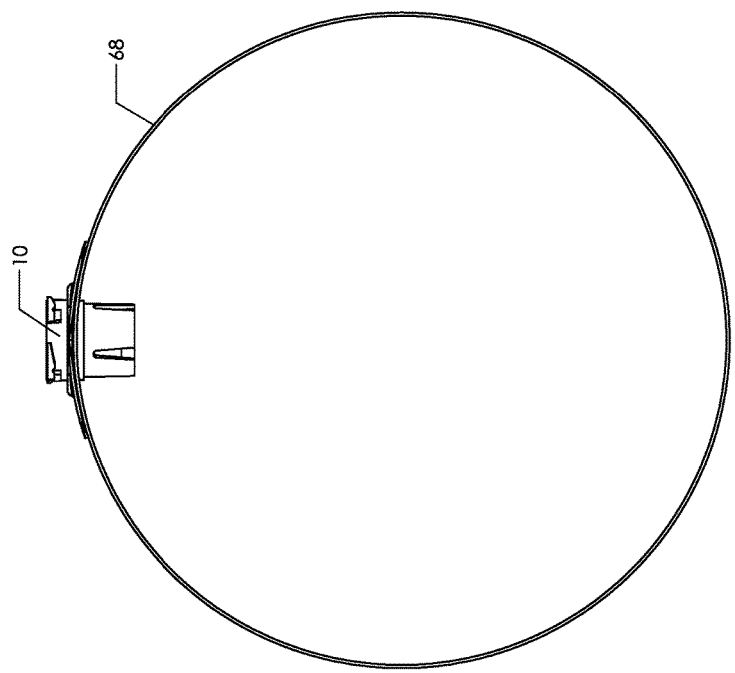

INTEGRAL ANTI-SIPHON FILLER NECK

1. TECHNICAL FIELD

The present invention relates to an integral anti-siphon device that is incorporated into a fuel filler neck secured to a fuel tank.

2. BACKGROUND OF THE INVENTION

Commercial trucks typically include one or more fuel tanks that hold a large amount of fuel. These large fuel tanks are at risk of fuel theft, namely, siphoning of fuel from the fuel tank. To inhibit siphoning of fuel from these large fuel tanks, an anti-siphon device may be placed within the fuel filler neck, the location where fuel is filled into the one or more fuel tanks on the truck. Prior art anti-siphon devices are "after-market" devices that are secured within an existing fuel filler neck after the fuel filler neck is installed on a fuel tank. These after-market anti-siphon devices are an additional cost to the truck operator and may reduce the fuel filling area of the fuel filler neck. Moreover, these after-market anti-siphon devices may be susceptible to removal from a fuel filler neck by a thief. There is a need, therefore, to provide an anti-siphon device that does not result in an additional cost to a truck operator, which does not reduce the fuel filling area of a fuel filler neck and which may not be susceptible to removal from the fuel filler neck of the fuel tank.

SUMMARY OF THE INVENTION

The present invention relates to an anti-siphon device that is incorporated into a fuel filler neck that is installed on a fuel tank during manufacture of a commercial vehicle. The inventive anti-siphon device does not reduce the inner circumference of a fuel filler neck compared with prior art anti-siphon devices, does not require the truck operator to purchase their own after-market anti-siphon device, and cannot be removed from the fuel tank filler neck.

In particular, the present invention relates to an integrated anti-siphon fuel filler neck assembly that includes a hose or siphon inhibiting structure. In one embodiment the invention includes a hub and spoke assembly that defines wedge shaped apertures and a side wall that includes side wall apertures connected to the wedge shaped apertures, wherein the wedge shaped apertures and the side wall apertures are sized to prevent a siphon hose from passing there through.

BRIEF DESCRIPTION OF THE DRAWINGS

FIG. 1 is a side view of one example embodiment of an integral anti-siphon filler neck.

FIG. 2 is a top view of the integral anti-siphon filler neck of FIG. 1.

FIG. 3 is another side view of the integral anti-siphon filler neck of FIG. 1.

FIG. 4 is a bottom view of the integral anti-siphon filler neck of FIG. 1.

FIG. 5 is another side view of the integral anti-siphon filler neck of FIG. 1.

FIG. 6 is an isometric view showing the bottom and side of the integral anti-siphon filler neck of FIG. 1.

FIG. 25 is a top plan view of one embodiment of an integral anti-siphon filler neck installed on a fuel tank, only a portion of the fuel tank being shown.

FIG. 26 is a side view of the fuel tank of FIG. 25.

FIG. 27 is another side view of the fuel tank of FIG. 25.

DETAILED DESCRIPTION OF THE PREFERRED EMBODIMENTS

Figure 9:
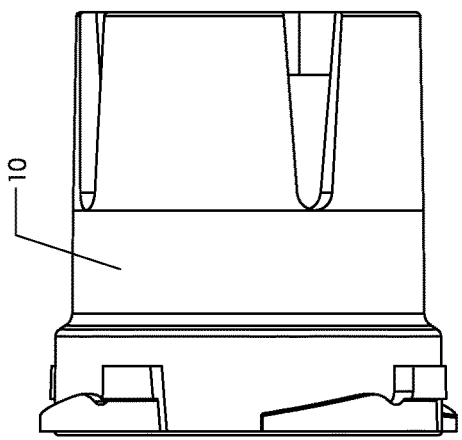
FIG. 9 is another side view of the integral anti-siphon filler neck of FIG. 7.
Figure 8:
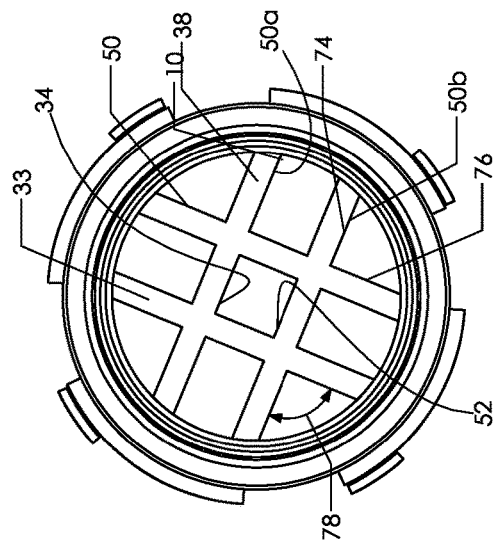
FIG. 8 is a top view of the integral anti-siphon filler neck of FIG. 7.
Figure 7:
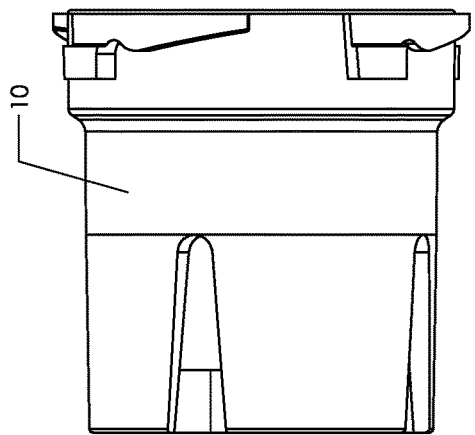
FIG. 7 is a side view of another example embodiment of an integral anti-siphon filler neck.
Figure 12:
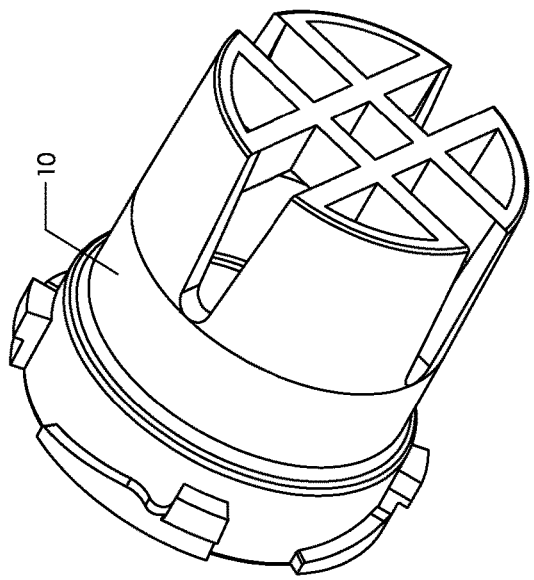
FIG. 12 is an isometric view showing the bottom and side of the integral anti-siphon filler neck of FIG. 7.
Figure 11:
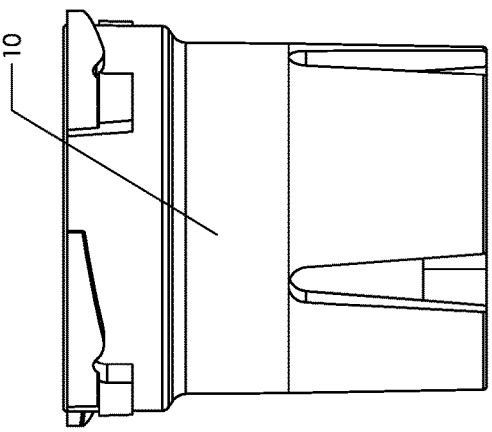
FIG. 11 is another side view of the integral anti-siphon filler neck of FIG. 7.
Figure 10:
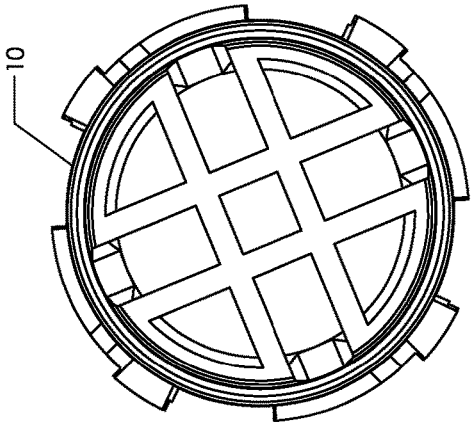
FIG. 10 is a bottom view of the integral anti-siphon filler neck of FIG. 7.
Figure 15:
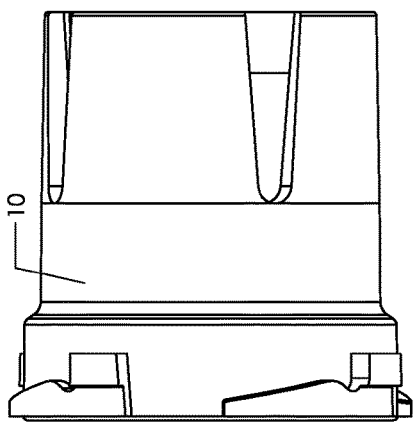
FIG. 15 is another side view of the integral anti-siphon filler neck of FIG. 13.
Figure 18:
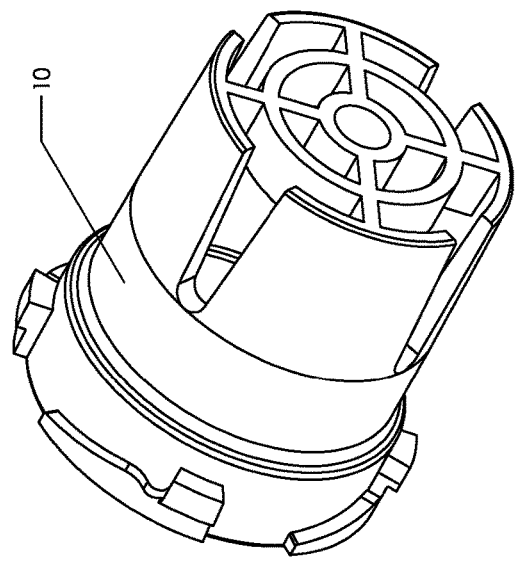
FIG. 18 is an isometric view showing the bottom and side of the integral anti-siphon filler neck of FIG. 13.
Figure 14:
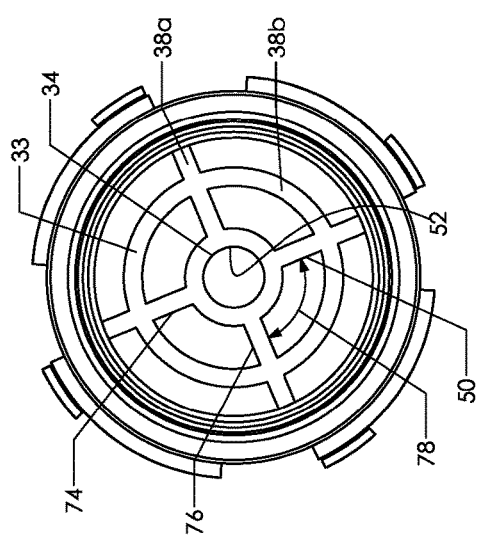
FIG. 14 is a top view of the integral anti-siphon filler neck of FIG. 13.
Figure 17:
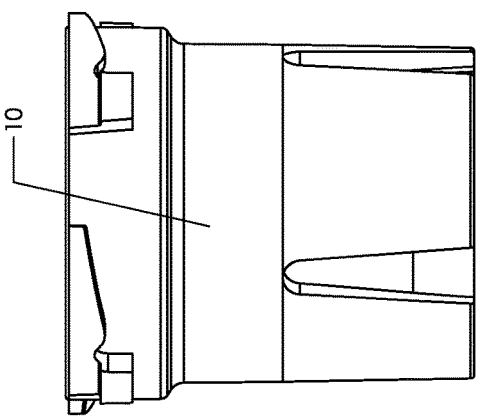
FIG. 17 is another side view of the integral anti-siphon filler neck of FIG. 13.
Figure 13:
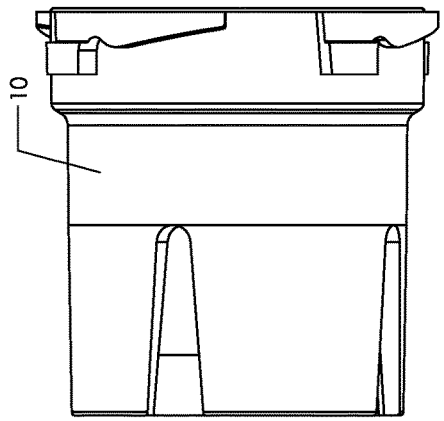
FIG. 13 is a side view of another example embodiment of an integral anti-siphon filler neck.
Figure 16:
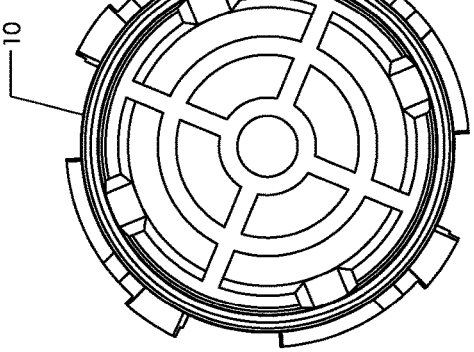
FIG. 16 is a bottom view of the integral anti-siphon filler neck of FIG. 13.
Figure 20:
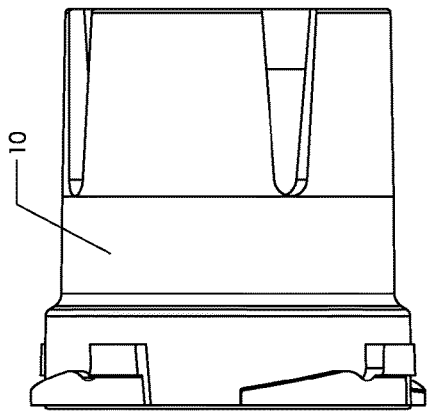
FIG. 20 is a top view of the integral anti-siphon filler neck of FIG. 19.
Figure 19:
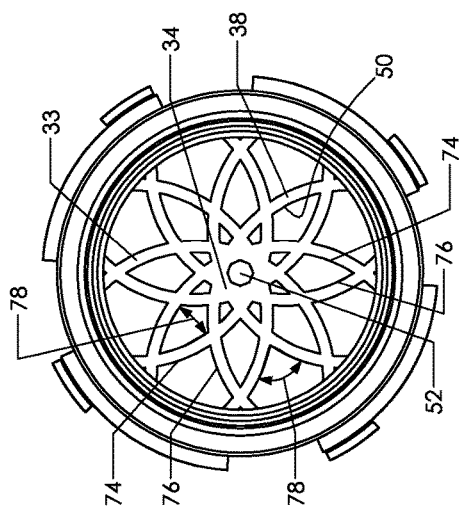
FIG. 19 is a side view of another example embodiment of an integral anti-siphon filler neck.
Figure 22:
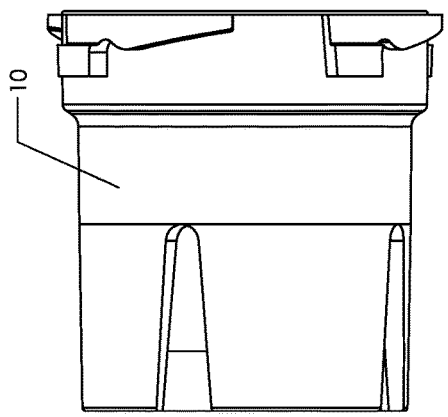
FIG. 22 is a bottom view of the integral anti-siphon filler neck of FIG. 19.
Figure 24:
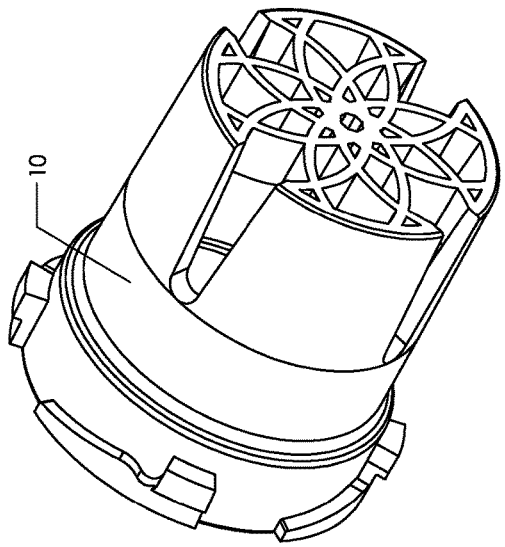
FIG. 24 is an isometric view showing the bottom and side of the integral anti-siphon filler neck of FIG. 19.
Figure 23:
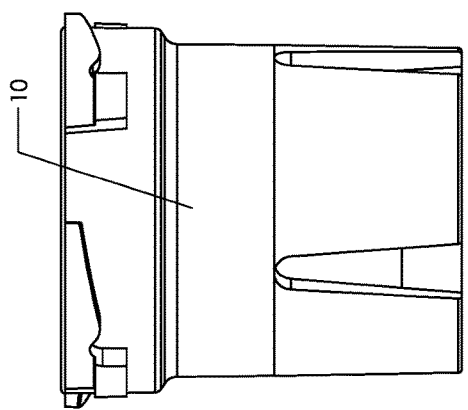
FIG. 23 is another side view of the integral anti-siphon filler neck of FIG. 19.
Figure 21:
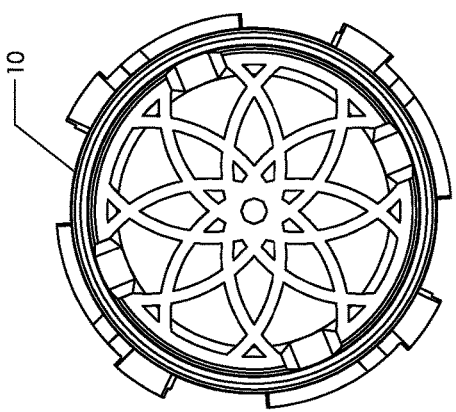
FIG. 21 is another side view of the integral anti-siphon filler neck of FIG. 19.
Figure 29:
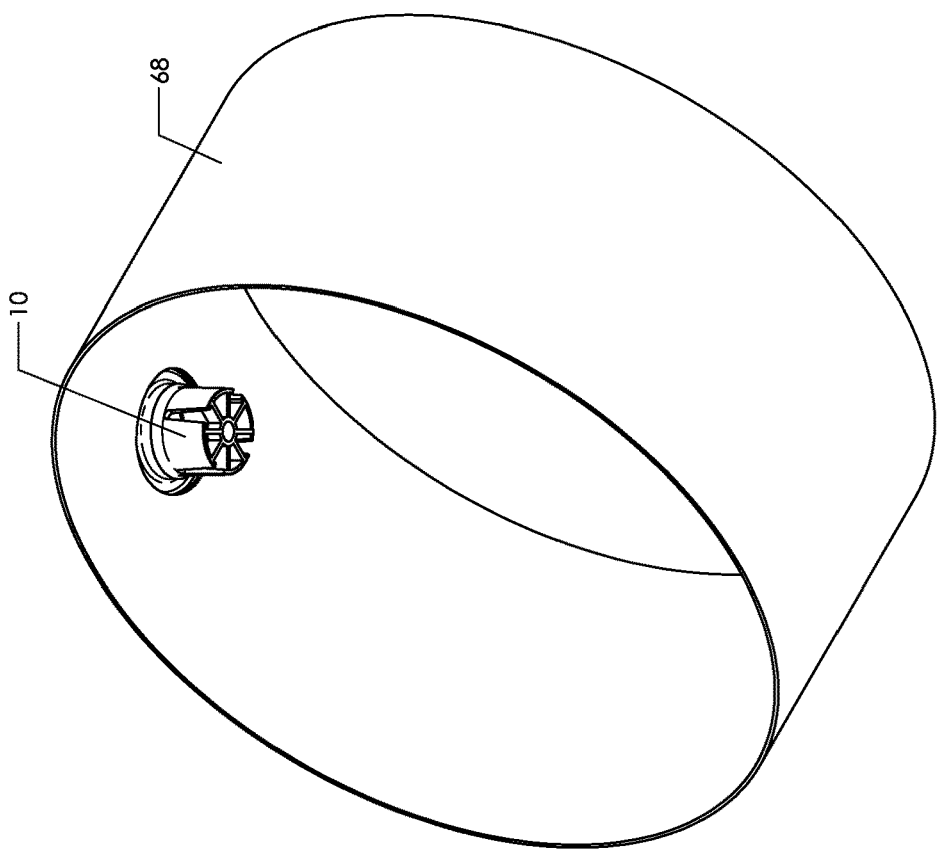
FIG. 29 is an isometric view showing the interior and side of the fuel tank of FIG. 25.
Figure 28:
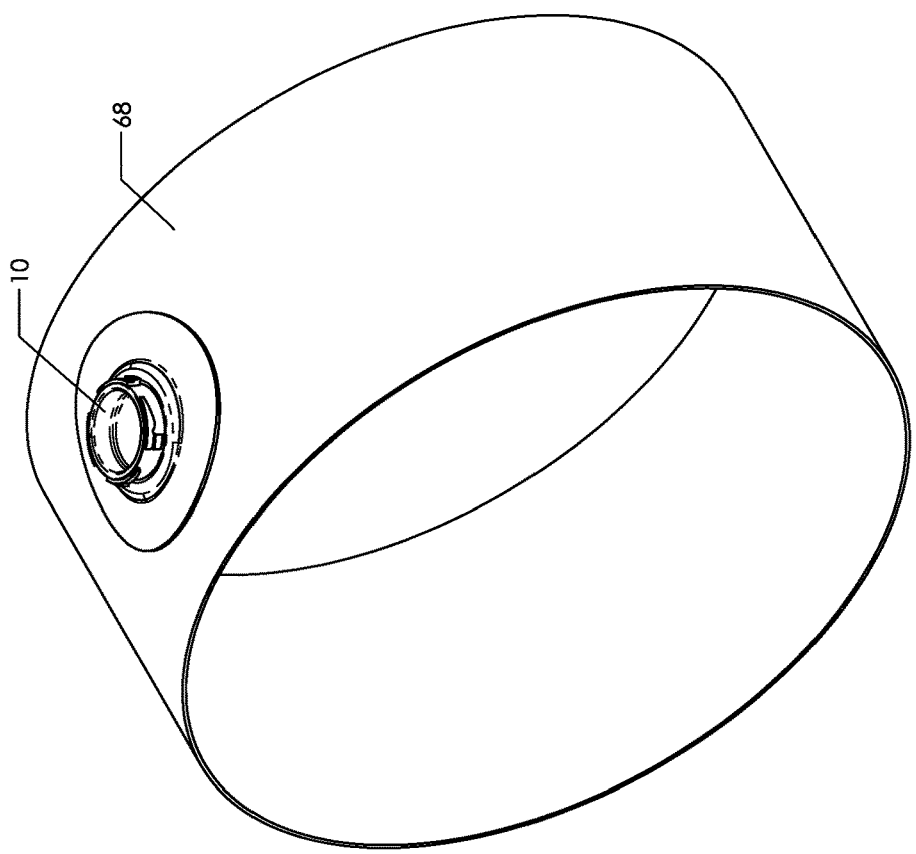
FIG. 28 is an isometric view showing the top and side of the fuel tank of FIG. 25.
Figure 32:
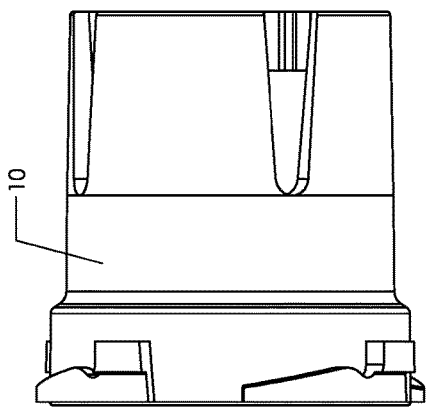
FIG. 32 is another side view of the integral anti-siphon filler neck of FIG. 30.

FIG. 1 is a side view of one example embodiment of an integral anti-siphon fuel filler neck 10. Filler neck 10 includes a top region 12, a central region 14 and a lower region 16. Top region 12 includes a top surface 18 and a cam ramp assembly 20 positioned adjacent the top surface 18. The cam ramp assembly 20 includes a cam surface 22 with an indentation 24 adapted to receive a cam pin (not shown) for securing a fuel cap (not shown) thereon.

Top region 12, central region 14 and lower region 16 generally define a cylindrical cross section (FIG. 2). In the embodiment shown, filler neck 10 includes a length 26 in a range of 2.5 to 10 inches, a diameter 28 in top region 12 of approximately 2.5 inches, a diameter 30 in central region 16 of approximately 2.25, and a diameter 32 in lower region 16 of approximately 2.5. In the embodiment shown filler neck 10 may be cast of aluminum but in other embodiments filler neck may be manufactured by other methods, such as extrusion, and of other materials, such as steel, iron, brass, stainless steel, magnesium, nylon, polypropylene, and the like.

As shown in FIGS. 1-6, the integral anti-siphon features of filler neck 10, in the embodiment shown, are found in lower region 16. In particular, the integral anti-siphon features of the present invention include a siphon inhibiting device 33 in a lower region 16, such as a hub and spoke device 34 including a central hub 36 with members, such as spokes, 38 extending outwardly toward a side wall 40 of lower region 16. In the embodiment shown, hub and spoke device 34 includes eight individual spokes 38 extending radially outwardly from hub 36 wherein each spoke 38 defines a length 42 of approximately 1-inch, a width 44 of approximately 0.10-inches, and a height 46 (FIG. 6) of approximately 0.50 inches. Spokes 38 may be evenly spaced around hub 36, such as at an angle 48 of approximately forty-five degrees with respect to one another, to define an aperture 50, such as a wedge shaped aperture 50, between each of spokes 38. Wedge shaped aperture 50 is defined by adjacent edge surfaces 74 and 76 wherein the edges themselves, or an extension thereof, define an angle 78 with respect to one another, of ninety degrees or less. In other words, adjacent members define a pie shaped aperture there between wherein two side surfaces 74 and 74, or an extension line of the two side surfaces in the embodiment, of the pie shaped aperture are positioned with respect to one another at an angle 78 of ninety degrees or less. Hub 36 may include a central aperture 52.

Wedge shaped apertures 50 and central aperture 52 together define an air and a fluid flow path 54 through fuel filler neck 10. However, wedge shaped apertures 50 and central aperture 52 are sized to inhibit a large diameter siphon hose from extending there through so that the end of a large diameter siphon hose, such as a garden hose, may not be placed through filler neck 10 downwardly into fuel held within a fuel tank 68 (FIG. 26) on which filler neck 10 is installed. A very small siphon hose, such as small medical tubing, may still be placed through anti-siphon wedge shaped apertures 50 and central aperture 52. However, such a small hose would only allow siphoning of fuel at such a slow rate that a thief would likely not take the time to siphon fuel from a large fuel tank with a small siphon hose. Accordingly, fuel filler neck 10 allows fuel to be filled into a fuel tank 68 on which filler neck 10 is secured while prohibiting a thief from placing a hose down into the fuel and siphoning fuel out of the fuel tank 68.

The wedge or pie shaped apertures 50 are found to a provide strong "A-frame" type structure which resists attempts to damage filler neck members 38. For example, members 38 that are cast integral with side wall 40 of filler neck 10 provide a flow through structure that allows air and fuel to pass there through, yet the adjacent members 38 that define the wedge shape edges 74 and 76 of the aperture 50 resist damage from a thief trying to place a suction hose through the filler neck 10, such as resisting damage from a thief ramming a hard object like a crow bar into the filler neck 10. Accordingly, the wedge-shaped apertures 50 of the present invention, which are secured directly to the side wall of the fuel filler neck, are robust structures but do not reduce the inner circumference of the fuel filler neck 10 and therefore do not inhibit placement of a fuel filler nozzle into fuel filler neck 10. In other words, the inner diameter of the fuel filler neck 10 is not reduced by anti-siphon device 33 except along height 46 (FIG. 6), which is downwardly of top surface 34a, of the anti-siphon device.

Still referring to FIGS. 1-6, lower region 16 further includes side wall apertures, or slots, 56 in side wall 40. In the embodiment shown, lower region 16 includes four apertures 56 in side wall 40, wherein each of apertures 56 are aligned and connected with a wedge shaped aperture 50 of hub and spoke device 34. Each of apertures 56 define a height 58 in a range of approximately 1 to 3 inches, and a width 60 (FIG. 6), measured adjacent a top surface 34a of spoke device 34, in a range of approximately 0.25 to 0.75-inches. Width 60 of each aperture 56 may be less than twenty five percent, and preferably less than fifteen percent, of a circumference 66 of side wall 40 of lower region 16. A maximum dimension of width 60 of side wall apertures 56 may also be less than a maximum width 51 of wedge-shaped apertures 50 (FIG. 4), measured at a point on the side wall 40 where spokes 38 contact the side wall. This size of apertures 56 inhibits a large siphon hose from extending there through, while still allowing fuel and/or air to flow freely there through during filling of fuel into a fuel tank 68 on which filler neck 10 is installed. A very small siphon hose may still be placed through anti-siphon side wall apertures 56. However, such a small hose would only allow siphoning of fuel at such a slow rate that a thief would likely not take the time to siphon fuel from a large fuel tank with a small siphon hose. Accordingly, apertures 56 allow fuel to flow into a fuel tank through hub and spoke device 34 while air may escape the fuel tank through side wall apertures 56 during fueling. In the embodiment shown, apertures 56 are spaced around lower region 16 at an angle 62 (FIG. 4) of ninety degrees.

FIGS. 7-12 show an integral anti-siphon filler neck 10 having a siphon inhibiting device 33 including a rectangular grid pattern that defines a central hub 34 that is square in shape, and outwardly extending members 38 that define apertures 50, such as rectangular shaped apertures 50a and wedge shaped apertures 50b, that are defined by adjacent end surfaces 74 and 76 which define an angle 78 with respect to one another, of ninety degrees or less. Central hub 34 defines a central aperture 52 that is square in shape.

FIGS. 13-18 show an integral anti-siphon filler neck 10 having a siphon inhibiting device 33 including a concentric ring pattern that defines a central hub 34 that is round in shape. This embodiment also includes outwardly extending radial members 38a and concentric members 38b, that define truncated wedge shaped apertures 50 that are defined by adjacent end surfaces 74 and 76 which define an angle 78 with respect to one another, of ninety degrees or less. Central hub 34 defines a central aperture 52 that is round in shape.

FIGS. 19-24 show an integral anti-siphon filler neck 10 having a siphon inhibiting device 33 including an overlapping arc pattern that defines a central hub 34 that is round in shape, and outwardly extending radial members 38 that define apertures 50, such as wedge shaped apertures 50 that are defined by adjacent end surfaces 74 and 76 that define an angle 78 with respect to one another, of ninety degrees or less. Central hub 34 defines a central aperture 52 that is round in shape.

FIGS. 25-29 show integral filler neck 10 of the present invention secured directly to a fuel tank 68 by a weld 80 around an outer surface 64 of central region 14 to secure the filler neck 10 to a corresponding aperture 70 in a fuel tank 68. Because the filler neck 10 is welded directly to a fuel tank 68, the filler neck is not easily removed from the fuel tank as are prior art anti-siphon devices that may be crimped in placed within an existing and distinct fuel filler neck, after manufacture of the prior art fuel filler neck.

Fuel filler neck 10, including the siphon inhibiting device 33 and side wall apertures 56, is not an after-market device placed within an existing fuel filler neck but in this inventive assembly device 33 is manufactured integral with filler neck 10 itself which is secured directly to a fuel tank when the vehicle is manufactured. In the embodiment shown, fuel filler neck 10 is welded directly to the side wall 72 of the fuel tank 68 to secure filler neck 10 thereto. Accordingly, no after-market anti-siphon device is required, the inner diameter 32 (FIG. 4) of lower region 16 of filler neck 10 is not reduced by an after-market anti-siphon device placed within an existing filler neck of the prior art, and inventive filler neck 10 secured directly to the fuel tank cannot be removed by a thief.

FIGS. 30-35 show an integral anti-siphon filler neck 10 having a siphon inhibiting device 33 including a snowflake pattern that defines a central hub 34 that is round in shape, and outwardly extending radial members 38 that define apertures 50, such as wedge shaped apertures 50 that are defined by adjacent end surfaces 74 and 76 that define an angle 78 with respect to one another, of ninety degrees or less. Central hub 34 defines a central aperture 52 that is round in shape.

Figure 35:
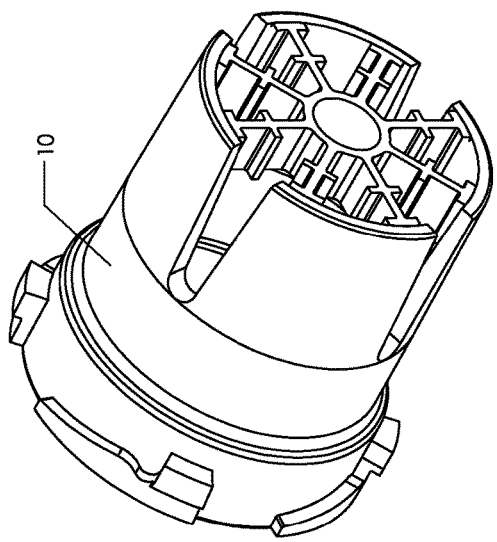
FIG. 35 is an isometric view showing the bottom and side of the integral anti-siphon filler neck of FIG. 30.
Figure 31:
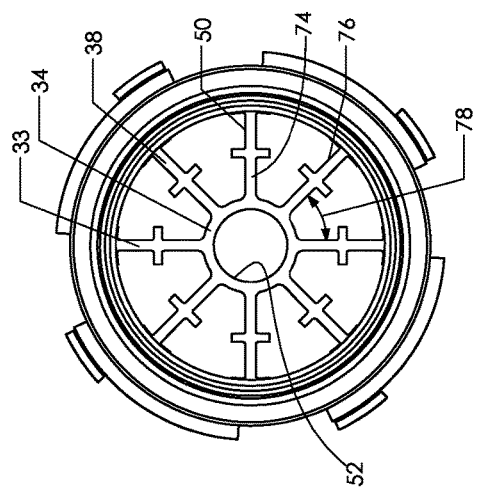
FIG. 31 is a top view of the integral anti-siphon filler neck of FIG. 30.
Figure 34:
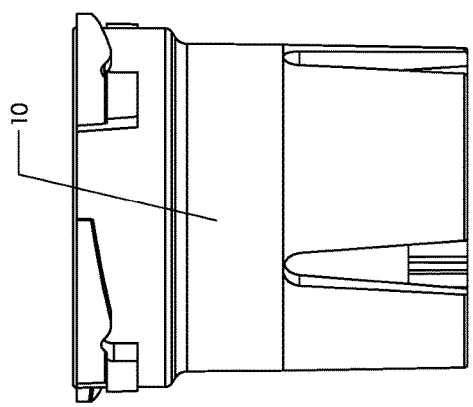
FIG. 34 is another side view of the integral anti-siphon filler neck of FIG. 30.
Figure 30:
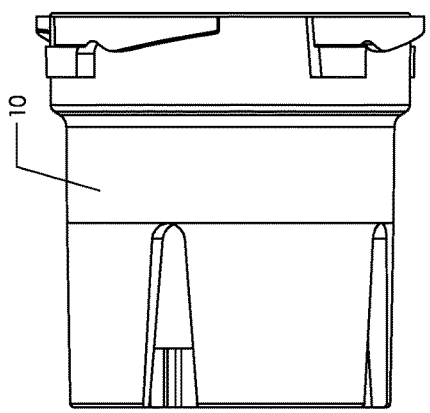
FIG. 30 is a side view of another example embodiment of an integral anti-siphon filler neck.
Figure 33:
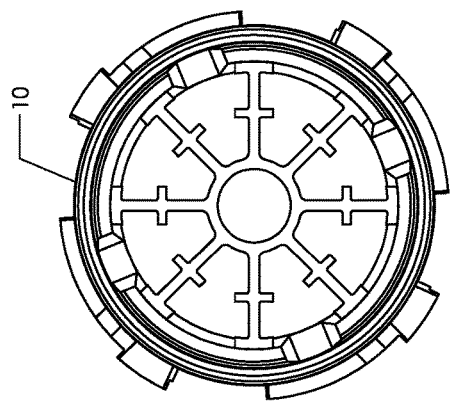
FIG. 33 is a bottom view of the integral anti-siphon filler neck of FIG. 30.
Figure 36:
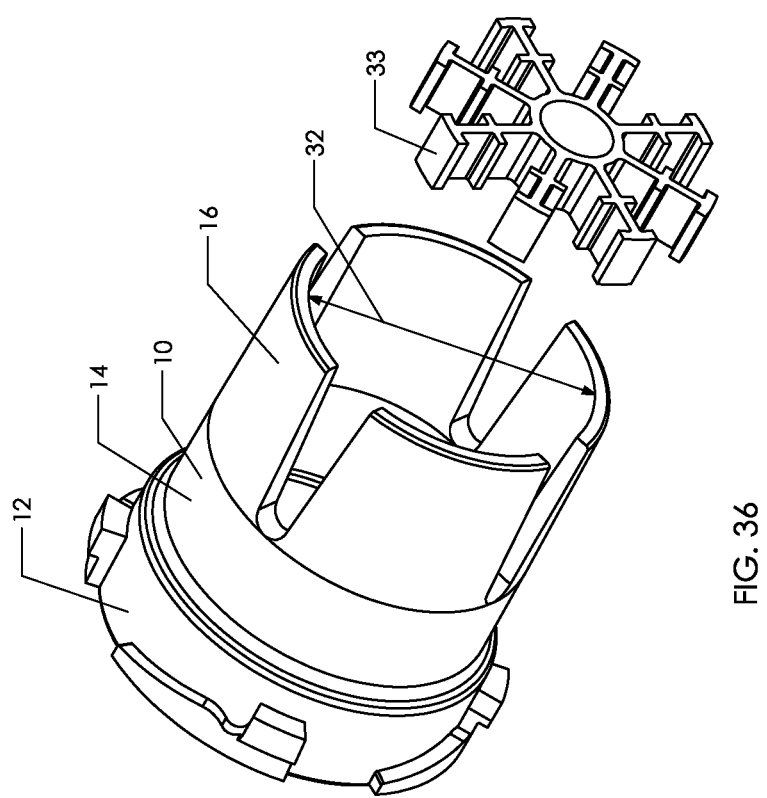
FIG. 36 is an exploded view of the integral anti-siphon filler neck of FIG. 30.

FIG. 36 shows an exploded view of anti-siphon filler neck 10 wherein siphon inhibiting device 33 is shown not yet installed within filler neck 10. In this embodiment, filler neck 10 is a die cast filler neck and anti-siphon device 33 is welded therein (FIG. 35). The anti-siphon device 33 may be secured to neck 10 by welding, brazing, soldering, adhesive bonding, crimping, or mechanical fastening such as with rivets, screws, nuts and bolts, and the like. In this embodiment, anti-siphon device 33 is secured within lower region 16 and does not extend upwardly into top region 12 or central region 14 of filler neck 10. In this manner, similar to the other embodiments shown, anti-siphon device 33 does not reduce the inner diameter 32 of filler neck 10 upwardly of anti-siphon device 33, and still provides wedge shaped apertures 50 for fuel to flow into the fuel tank 68 (FIG. 25).

As may be understood from the above description and drawings, the present invention has many advantages. In the above description numerous details have been set forth in order to provide a more thorough understanding of the present invention. It will be obvious, however, to one skilled in the art that the present invention may be practiced using other equivalent designs.

I claim:

1. An integral anti-siphon fuel filler neck assembly, comprising:
   a lower region that defines a side wall; and
   a hub having a plurality of members extending outwardly there from, each of said members directly contacting said side wall, and wherein adjacent ones of said members define a wedge-shaped aperture there between, wherein
   said side wall includes a plurality of side wall apertures sized to allow air to move there through wherein each side wall aperture defines a width that is less than a width of said wedge shaped aperture, wherein each of said side wall apertures are connected to only one of said wedge shaped apertures between said adjacent ones of said members that define said wedge-shaped aperture there between.

2. The fuel filler neck assembly of claim 1 wherein said plurality of members comprises eight members each spaced at an angle of 45 degrees with respect to one another around said hub.

3. The fuel filler neck assembly of claim 1 further comprising a fuel cap securement assembly for securing a fuel cap directly to said fuel filler neck.

4. The fuel filler neck step assembly of claim 3 wherein said fuel cap securement assembly comprises a cam ramp assembly.

5. The fuel filler neck assembly of claim 1 further comprising a central region that defines a continuous side wall there around, and wherein said continuous side wall is welded to a fuel tank aperture to secure said fuel filler neck thereto.

6. The fuel filler neck assembly of claim 1 wherein said hub defines a central aperture and wherein adjacent ones of said members each define a wedge shaped aperture there between that is defined by end surfaces that define an angle with respect to one another of at most ninety degrees.

7. An integral anti-siphon fuel filler neck assembly, comprising:
   a cylindrical body that defines a side wall; and
   a hub positioned within said cylindrical body and having a plurality of members extending outwardly from said hub, each of said members directly contacting said side wall, and wherein adjacent ones of said members define a wedge shaped aperture there between, and
   wherein said side wall includes a plurality of side wall apertures sized to allow air to move there through, wherein each of said plurality of side wall apertures is connected to a corresponding one of said wedge shaped apertures, wherein each side wall aperture defines a width that is less than a width of said corresponding one of said wedge shaped apertures, and wherein said width of each of said side wall apertures is aligned with said width of said corresponding one of said wedge shaped apertures.

8. A fuel filler neck assembly of claim 7 wherein each of said members are evenly positioned around said hub and wherein said side wall apertures are evenly positioned around said side wall between ones of said members.

9. The fuel filler neck assembly of claim 7 wherein said plurality of members comprises eight spokes and wherein said hub defines a central aperture.

10. The fuel filler neck assembly of claim 7 further comprising a fuel cap securement device positioned on an outer surface of said side wall and wherein said plurality of members contact an inner surface of said side wall.

11. The fuel filler neck of claim 7 wherein each of said side wall apertures is in fluid communication with only one corresponding wedge-shaped aperture.

12. An integral anti-siphon fuel filler neck assembly, comprising:
   a filler neck including a side wall having an outer surface that is secured directly to a fuel tank side wall;
   a central member having a plurality of elongate members extending outwardly there from, each of said elongate members directly contacting an inner surface of said filler neck side wall, and wherein adjacent ones of said elongate members define an elongate member aperture there between; and said filler neck side wall including a plurality of side wall apertures that each define a maximum width that is less than a maximum width of said elongate member aperture, and wherein said plurality of side wall apertures extend from a lower surface of said side wall to a central region of said side wall and are each aligned with only a single corresponding elongate member aperture.

13. The fuel filler neck assembly of claim 12 further comprising a fuel cap securement assembly secured to said outer surface of said filler neck side wall.

14. The fuel filler neck assembly of claim 12 wherein said filler neck side wall is secured directly to said fuel tank side wall in said central region of said filler neck side wall.

15. The fuel filler neck assembly of claim 12 wherein said plurality of elongate members includes at least eight elongate members evenly spaced around said central member, and wherein said central member is cylindrical and includes a central aperture.

16. The fuel filler neck assembly of claim 15 wherein said plurality of side wall apertures each define a maximum width, measured in a plane parallel to a top surface of said elongate members, wherein said maximum is less than fifteen percent of a circumference of said side wall.

17. The fuel filler neck assembly of claim 12 including a plurality of elongate member apertures, wherein each elongate member aperture includes a first and a second side surface positioned at an angle with respect to one another of at most ninety degrees.

18. The fuel filler neck of claim 12 wherein said elongate aperture is wedge shaped.

\* \* \* \* \*